United States Patent [19]
Smith

[11] Patent Number: 5,902,960
[45] Date of Patent: May 11, 1999

[54] ELECTRICAL WIRE JUNCTION BOX COVER

[76] Inventor: Jeff Smith, 270 Mystery Rock Rd., Cape Girardeau, Mo. 63701

[21] Appl. No.: 08/907,313

[22] Filed: Aug. 6, 1997

[51] Int. Cl.[6] .................................................. H02G 3/14
[52] U.S. Cl. ............................................. 174/66; 220/241
[58] Field of Search ................................. 174/48, 50, 55, 174/58, 66, 67; 220/3.8, 241, 242; 33/528, DIG. 10

[56] References Cited

U.S. PATENT DOCUMENTS

| | | | |
|---|---|---|---|
| 3,862,351 | 1/1975 | Schindler et al. | 174/58 |
| 4,134,636 | 1/1979 | Kleinatland et al. | 439/535 |
| 4,335,271 | 6/1982 | Haslbeck | 174/65 R |
| 4,343,411 | 8/1982 | Chesnut et al. | 220/242 |
| 4,707,564 | 11/1987 | Gonzales | 174/66 |
| 5,170,014 | 12/1992 | Borsh | 174/53 |
| 5,180,886 | 1/1993 | Dierenbach et al. | 174/66 |
| 5,212,899 | 5/1993 | Fandreyer | 40/661.11 |
| 5,223,673 | 6/1993 | Mason | 174/53 |
| 5,359,152 | 10/1994 | Hone-Lin | 174/53 |
| 5,562,222 | 10/1996 | Jordan et al. | 220/3.8 |
| 5,710,392 | 1/1998 | Bordwell et al. | 174/50 |

FOREIGN PATENT DOCUMENTS

| | | | |
|---|---|---|---|
| 0359651 | 3/1990 | European Pat. Off. | 174/58 |
| 2211364 | 6/1989 | United Kingdom | 174/58 |

*Primary Examiner*—Kristine Kincaid
*Assistant Examiner*—Dhiru R. Patel
*Attorney, Agent, or Firm*—Robbins & Robbins

[57] ABSTRACT

A cover for shielding the interior of an electrical wire junction box from foreign material during wall construction. The cover is flexible and has a shape and size approximating that of the interior walls of the junction box housing so that it may be held within the housing in a snug press-fit relationship. The cover has a frangible portion that can be bent back to create a slot for ease in removal of the cover from the junction box housing.

11 Claims, 4 Drawing Sheets

ELECTRICAL WIRE JUNCTION BOX COVER

BACKGROUND OF THE INVENTION

This invention relates to cover guards for electrical wire junction boxes. In the construction of residential and commercial buildings, many tasks are performed both sequentially and simultaneously by various workers. Time is often a critical factor, and efficiency in performing the work is important. For instance, electrical work in the nature of laying down electrical wire, fuse boxes and the like is done prior to putting up interior walls, installing sheet rock, painting and the like. When the electrician finishes the first phase of the work, typically wires remain exposed and uncovered within the open electrical junction boxes. After the walls are put up, however, the electrician still must follow behind and complete the wiring to switches, appliances, lighting and so forth. It is desirable to keep the time spent on this second phase to a minimum.

A problem exists when the uncovered wires have been cut, painted, plastered, or otherwise damaged by workers putting up the walls around the junction boxes. When this is the case, the electrician must spend extra time in repairing or cleaning the wires prior to proceeding with the final phase of installation. This situation destroys the electrician's efficiency and unduly increases costs.

While certain remedies are available, such as screwing on the face plate, or crumpling up paper wads to stuff in the junction box housing, each of these methods take almost as much time as repairing or cleaning the wires anyway. A face plate would protect the wires but would itself get painted and require cleanup afterward. A paper wad would still leave parts of the junction box exposed unless it was carefully placed. It would therefore be desirable to have a device which could effectively guard the wires in the junction box housing, yet be easy and quick to install and be inexpensive to allow disposal.

SUMMARY OF THE INVENTION

By means of this invention there is provided a protective cover guard for electrical wire junction boxes. The cover has a shape approximating the open front of the junction box housing, and has a dimension equal to or slightly larger than that of the internal wall of the housing. The cover is flexible so that a snug press-fit can be made against the internal wall of the housing. The cover is simply pushed into position within the housing, effectively sealing off the wires inside. With the cover in place, subsequent activities by workers, such as the installation of dry wall, plastering and painting, will not disturb the wires put in place by the electricians.

The cover can be provided with slits in its edges so that the cover can pass over internal obstructions of the junction box housing, such as ribs for the junction box anchoring screws, to ensure an overall snug fit. Also, the cover can be provided with a pull tab so that it can be easily and quickly removed. Further, the cover can be labeled to describe and identify the particular wiring and purpose of the junction box that it is covering. Likewise, covers can be provided with customized labelling to identify a company who has installed the junction box.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
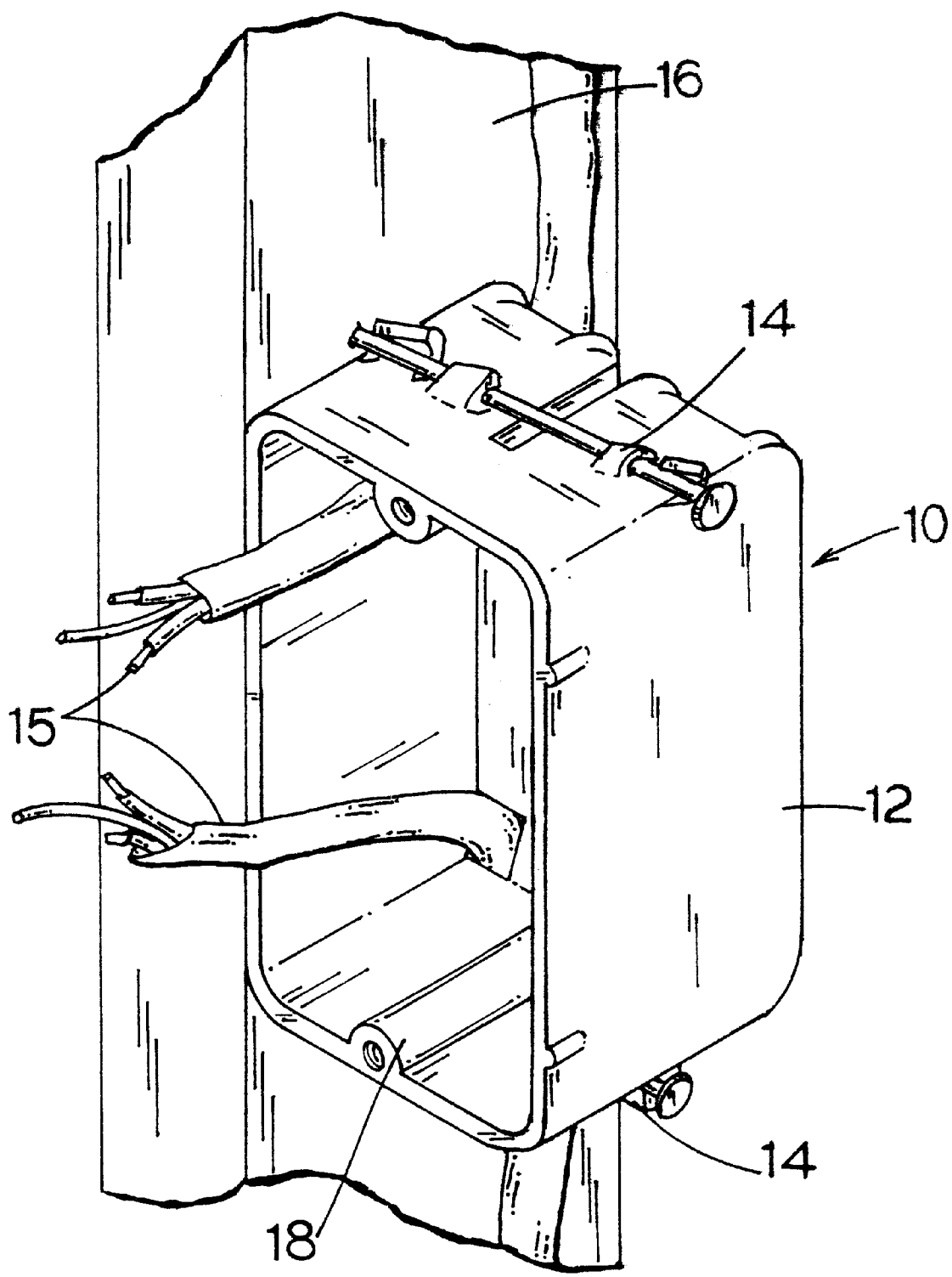
FIG. 1 is a perspective view of a junction box with wires exposed.

The cover of this invention is used with standard electrical wire junction boxes such as that shown as reference numeral 10 in FIG. 1, which shows the junction box attached to a section of bare framework construction. This box is typically comprised of a hollow rectangular housing 12 which has anchoring guides 14 for connecting the housing to a support stud 16. Electrical wires 15 are brought to a terminal point in the junction box for switching and other purposes. Junction boxes are generally standard in shape and size to accommodate installation. Because of the variations in the building framework and space requirements dictated by the coexistence of electric lines, gas lines, HVAC and the like, the junction box should be adaptable to be placed at different orientations. Typically, internal anchoring guides 18 are also provided in junction boxes along with external anchoring guides 14.

Figure 2:
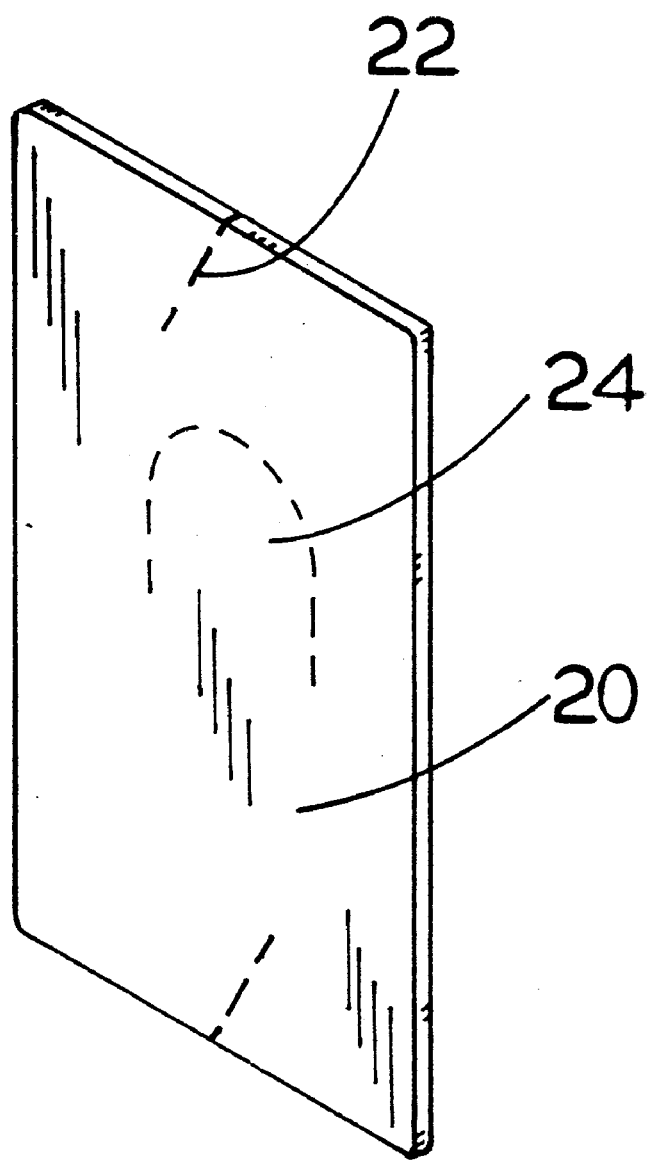
FIG. 2 is a view of the cover of the instant invention.
Figure 3:
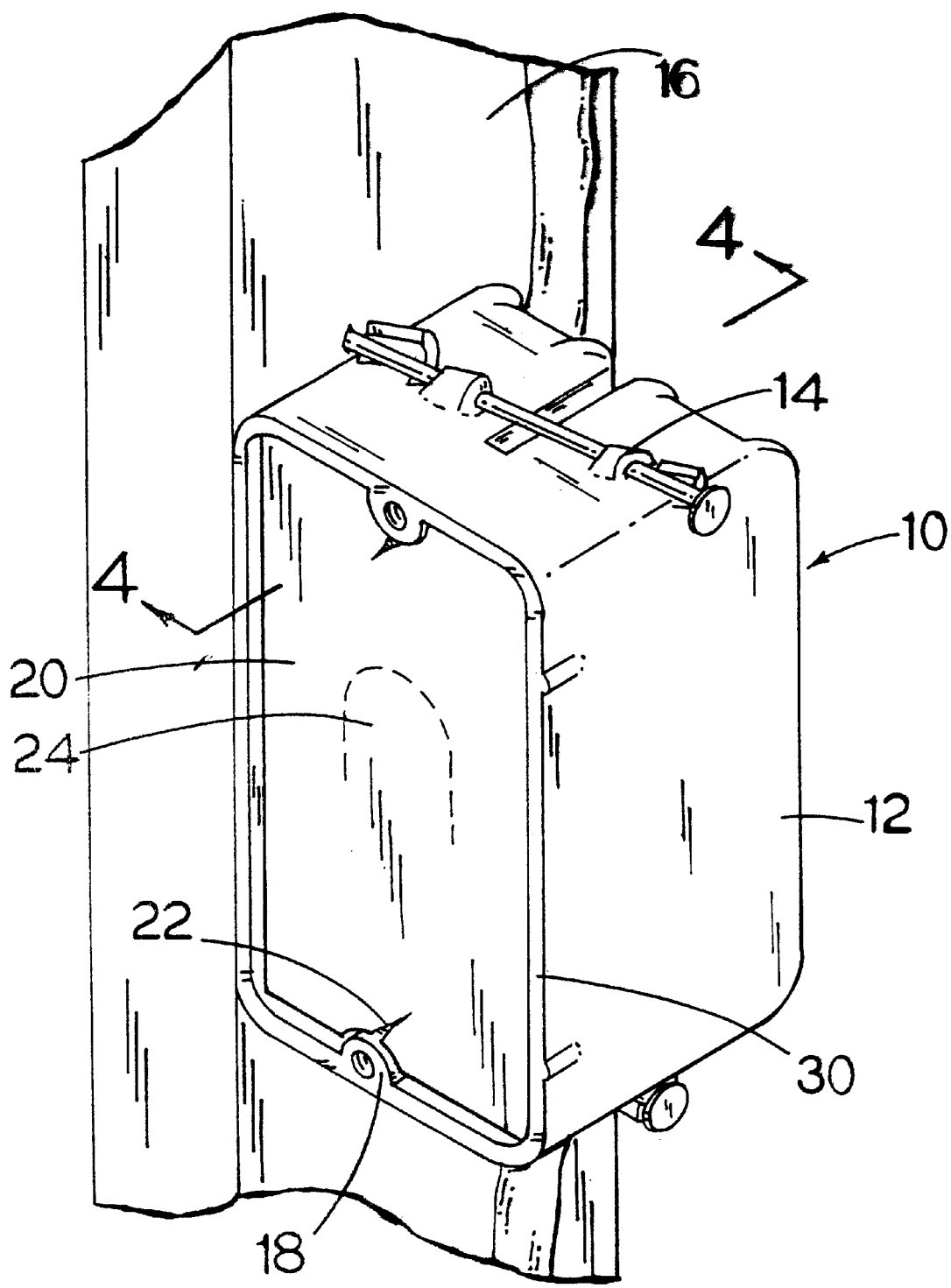
FIG. 3 is a view of the cover installed in a junction box.

The cover of this invention is shown in FIG. 2 and is generally indicated by the reference numeral 20. It is comprised of a planar piece of flexible material, such as cardboard. The covers can be easily mass produced by die cutting methods or by other processes generally known to those skilled in the art The shape of the cover approximates the shape of housing 12 and has a dimension the same size or slightly larger than the open front face of the housing so that the cover can be received in the housing with a snug press fitting relationship as shown in FIG. 3. The typical internal dimension of a standard junction box is about 2¹⁄₁₆" by 3½". Slits 22 may be provided at the edge of the cover to accommodate internal anchoring guides 18 within the housing 12. The cover may include a frangible portion 24 which can be broken or bent away to form a fingerhole for gripping. This portion may be pre-cut into the cover so that the frangible portion remains intact and flush with the cover until it is bent. Although not shown, other pulling means can be placed on the cover, such as a flap or string.

USE

As shown in FIG. 1, during construction, electrical junction boxes are installed onto the framework structure and wired by electricians generally prior to walls being put up and painted. After those other tasks are performed the electricians follow up with final connections and installation of switches, face plates and the like. Up until this final phase, however, the wire ends are exposed as shown in FIG. 1. These unprotected wire ends are subject to being cut, painted over, or caked with plaster during the wall installation phase.

Figure 4:
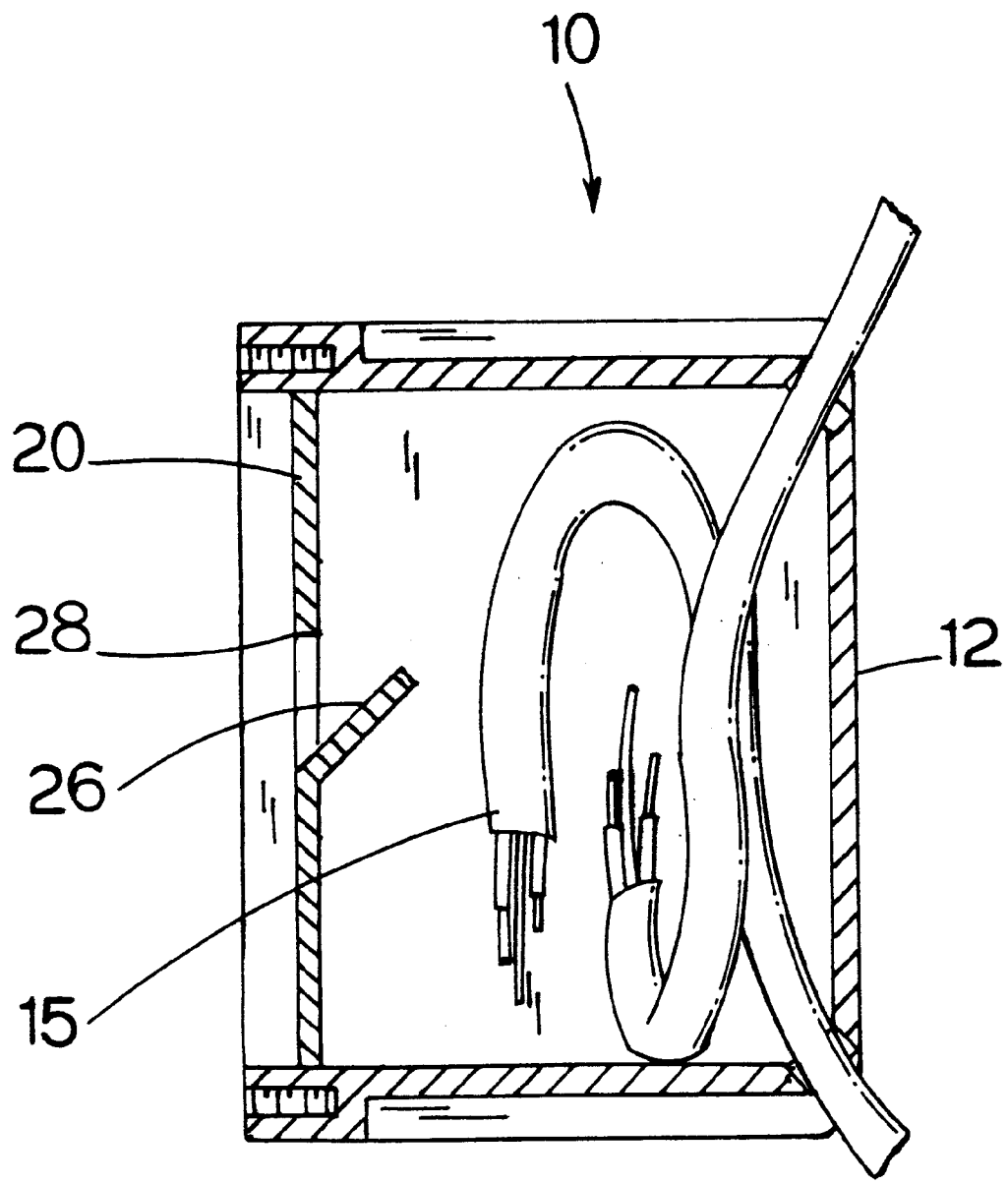
FIG. 4 is a cross-sectional view taken along line 4—4 in FIG. 3 of the cover installed in a junction box.

FIGS. 3 and 4 show how cover 20 is placed and held within junction box housing 12. Because the dimension of the area of cover 20 is at least as great or slightly greater than the walls forming the open face of housing 12, it is held in place by a snug press fit. Slits 22 allow cover 20 to pass around the internal anchoring guides 18 and still maintain a snug fit. Wires 15 are thus protected within the junction box from any external disturbances. The cover can be positioned in the housing so that it is flush with the front edge 30 of the housing. This arrangement completely shields the inside of the junction box and prevents any paint, plaster or joint compound from entering the box. When removal of the cover is desired, frangible portion 24 can be pushed in to form a flap 26 and hole 28 through which one can place a finger for gripping the cover as seen in FIG. 4. Removal is quickly and easily effected by simply pulling the cover out of the junction box. Because it is made of inexpensive material such as cardboard, the cover can be simply thrown away after use.

The cover can also be printed with alphanumeric indicia as a means for identification. Because each junction box may house wires for a particular and distinct purpose or function, such as TV, telephone or sound wiring, it would be helpful to be able to identify the underlying wire when it is shielded by the cover. Additionally, providing the cover with identifying indicia in the form of a company name or logo could be helpful in identifying the source party, i.e., installation company, manufacturer, distributor, etc., of the underlying wiring work.

The cover can be constructed of a shape to fit other standard junction boxes and fixtures, such as those having square shaped housings, and circular housings such as those for "can" lights.

Various changes and modifications may be made within this invention as will be apparent to those skilled in the art. Such changes and modifications are within the scope and teaching of this invention as defined in the claims appended hereto.

What is claimed is:

1. A cover for shielding the interior of an electrical wire junction box of the type comprising a housing having an open front, said cover having a flat shape approximating that of said open front of said housing and having a dimensional area substantially that of said open front of said housing, said cover being flexible, to enable an edge of said cover to be held against internal walls of said housing in a press fit biased relationship within said housing.

2. The cover of claim 1 in which means are provided on said cover for removal of said cover from said housing.

3. The cover of claim 2 in which said means comprises a flap disposed on said cover.

4. The cover of claim 2 in which said means comprises a frangible portion disposed on said cover, whereby said frangible portion is removable leaving a slot.

5. The cover of claim 1 in which identifying indicia are disposed on said cover.

6. The cover of claim 1 in which at least one slit is disposed along said edge of said cover, whereby said edge of said cover at said at least one slit can receive a projection along an internal wall of said housing to maintain said press fit relationship, means being provided on said cover for removal of said cover from said housing, and identifying indicia being disposed on said cover.

7. The cover of claim 6 in which said means comprises a frangible portion disposed on said cover, whereby said frangible portion is removable leaving a slot.

8. The cover of claim 1 in which said shape is rectangular.

9. The cover of claim 1 in which said shape is square.

10. The cover of claim 1 in which said shape is circular.

11. The cover of claim 1 in which at least one slit is disposed along said edge of said cover, whereby said edge of said cover at said at least one slit can receive a projection along an internal wall of said housing to maintain said press fit relationship.

* * * * *